Jan. 19, 1954    E. M. SIELOFF    2,666,668
SPRINKLING CAN
Filed Nov. 7, 1951

Elynor Maria Sieloff
INVENTOR.

BY *Clarence A. O'Brien*
*and Harvey B. Jacobson*
Attorneys

UNITED STATES PATENT OFFICE 2,666,668

SPRINKLING CAN

Elynor Maria Sieloff, Detroit, Mich.

Application November 7, 1951, Serial No. 255,197

1 Claim. (Cl. 299—102)

The present invention relates to new and useful improvements in sprinkling cans and has for its primary object to provide, in a manner as hereinafter set forth, a device of this character which may be readily collapsed, thus facilitating transporting and storing the device.

Another important object of the invention is to provide a collapsible sprinkling can of the aforementioned character which embodies novel handle attaching means.

Other objects of the invention are to provide a collapsible sprinkling can which will be comparatively simple in construction, strong, durable, highly efficient in use, compact, light in weight and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein.

Figure 1:
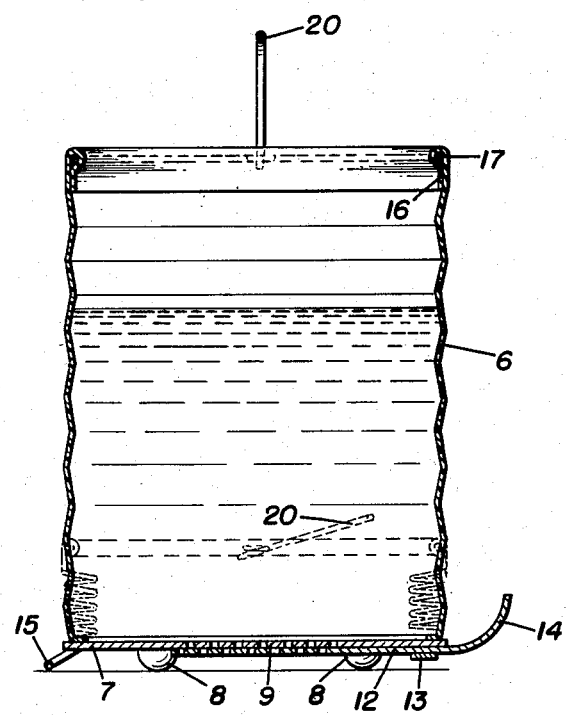
Figure 1 is a view in vertical section through a collapsible sprinkling can constructed in accordance with the present invention.

Referring now to the drawing in detail, it will be seen that the embodiment of the invention which has been illustrated comprises a cylindrical, circumferentially pleated container 6 of suitable flexible waterproof material. The container 6, which may be of any desired capacity, includes a rigid circular bottom 7 of plastic or other suitable material having mounted therebeneath a plurality of casters 8.

As illustrated to advantage in Figure 1 of the drawing, the bottom 7 of the container 6 is perforated as at 9. The discharge perforations 9 are controlled by a slidable valve in the form of a disk 10 which is mounted beneath the bottom 7 and which includes perforations 11 for registry with the perforations 9. The valve 10 is formed integrally with a handle 12 which is slidably mounted in guide 13 provided therefor beneath the container bottom 7 and which terminates in an upwardly curved outer end portion 14. Also mounted on the bottom 7 is a loop 15 which facilitates opening the container 6.

Figure 3:
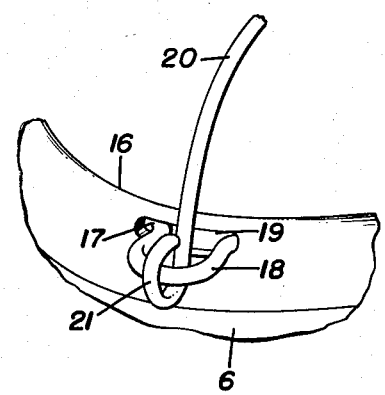
Figure 3 is a detail view in perspective, showing the bail or handle connecting means.
Figure 4:
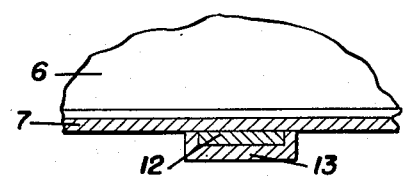
Figure 4 is a detail view in vertical section, taken substantially on the line 4—4 of Figure 2.
Figure 2:
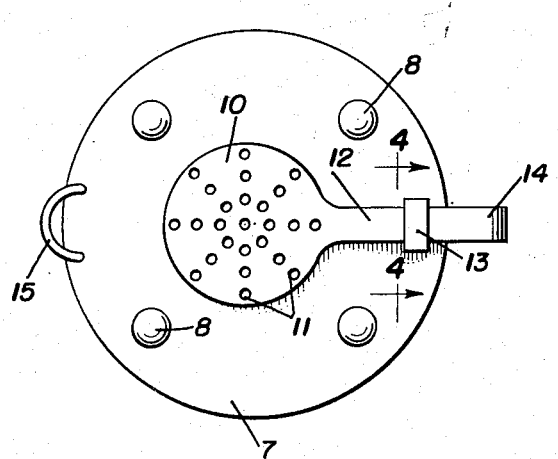
Figure 2 is a bottom plan view thereof.
Figure 5:
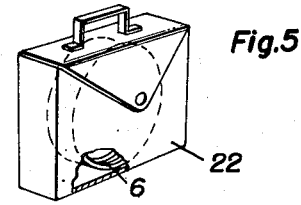
Figure 5 is a perspective view, showing the device collapsed and inserted in a carrying case or bag, a portion of said case being broken away.

The upper portion of the container 6 is turned in a manner to provide a hem 16 which encloses a wire ring 17. At diametrically opposite points the ring 17 is formed to provide substantially U-shaped loops 18 (see Figure 3) which project outwardly through slots 19 provided therefor in the container 6. A bail or handle 20 is mounted on the ring 17 through the medium of end loops 21 which encircle the loops 18.

It is thought that the manner in which the device is used will be readily apparent from a consideration of the foregoing. Briefly, the collapsible container 6 is opened by gripping the loop 15 with one hand and pulling on the handle 20 with the other hand. To discharge the water by gravity from the container, the slidable valve 10 is shifted to bring the perforations 11 into registry with the perforations 9 in the container bottom 7. Of course, to shut off the discharge of water from the container 6, the valve 10 is returned to closed position as seen in Figure 1 of the drawing. When not in use the container 6 may be readily collapsed in a manner to require a minimum of space, as suggested in dotted lines in Figure 1 of the drawing, and inserted in a carrying case 22 of suitable waterproof material.

It is believed that the many advantages of a collapsible sprinkling can constructed in accordance with the present invention will be readily understood and although a preferred embodiment of the device is as illustrated and described, it is to be understood that changes in the details of construction may be resorted to which will fall within the scope of the invention as claimed.

Having described the invention, what is claimed as new is:

A sprinkling can comprising, a collapsible container including a flat, rigid, circular bottom having discharge perforations therein, a substantially U-shaped guide mounted beneath said bottom adjacent the periphery thereof, and a discharge control valve comprising a flat disk slidable beneath the bottom and having perforations therein for registry with the first-named perforations, said valve further comprising an operating handle integral with the disk and slidable through the guide for mounting the valve on the bottom, said handle terminating in an upwarly curved, resilient free end portion engaged under tension in the guide for frictionally securing the valve in set position.

ELYNOR MARIA SIELOFF.

References Cited in the file of this patent

UNITED STATES PATENTS

| Number | Name | Date |
|---|---|---|
| 1,233,117 | Parker | July 10, 1917 |
| 1,353,650 | Groves | Sept. 21, 1920 |
| 2,097,240 | Rattey | Oct. 26, 1937 |
| 2,599,792 | Turausky | June 10, 1952 |